Sept. 3, 1940.    C. S. ASH    2,213,265
ROAD VEHICLE WHEEL
Filed April 7, 1937    3 Sheets-Sheet 1
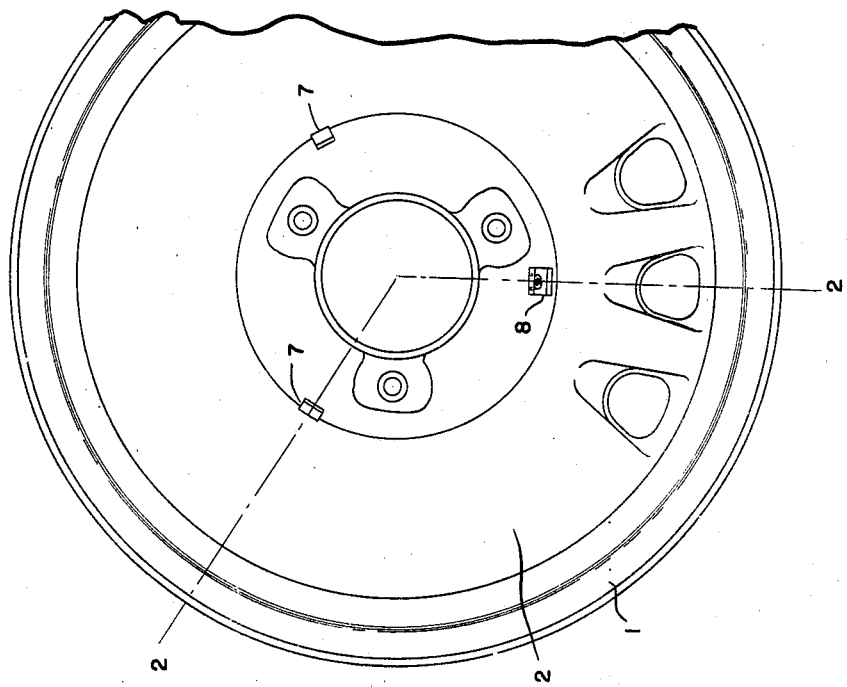
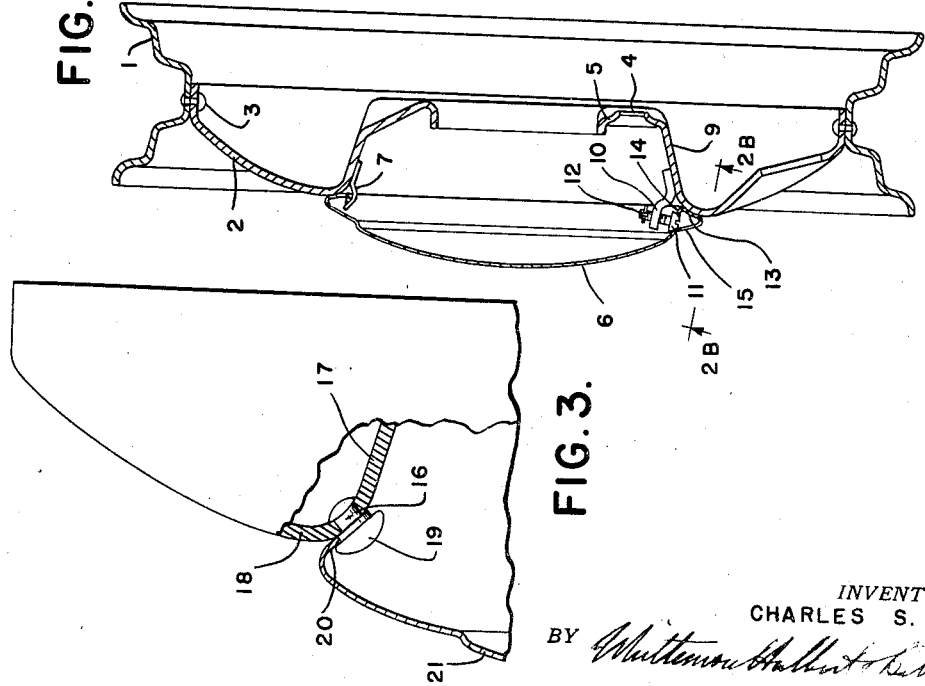
INVENTOR.
CHARLES S. ASH
BY
ATTORNEYS Sept. 3, 1940.                C. S. ASH                2,213,265
ROAD VEHICLE WHEEL
Filed April 7, 1937          3 Sheets-Sheet 2
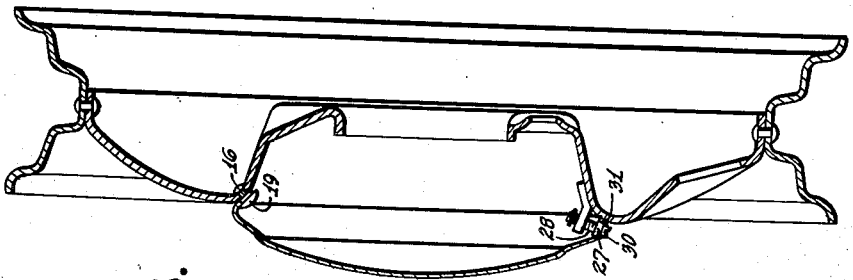
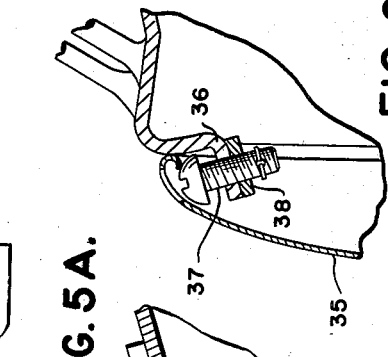
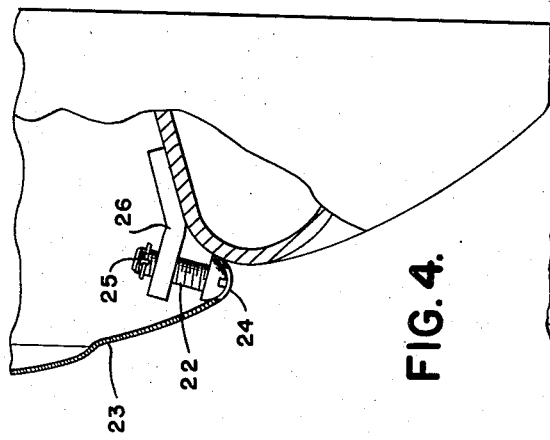
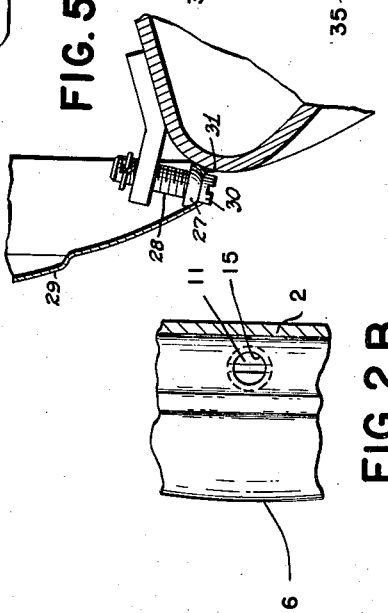
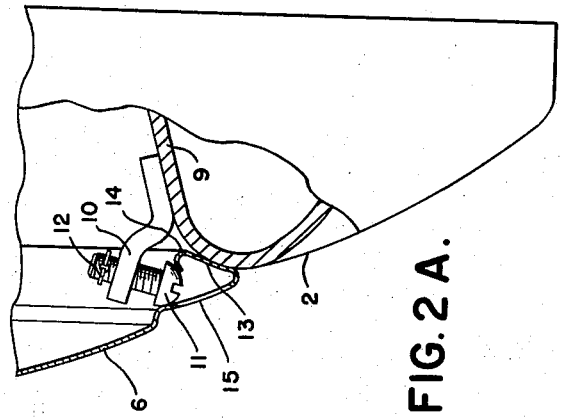
INVENTOR.
CHARLE S. ASH
BY
ATTORNEYS Sept. 3, 1940.  C. S. ASH  2,213,265
ROAD VEHICLE WHEEL
Filed April 7, 1937  3 Sheets-Sheet 3
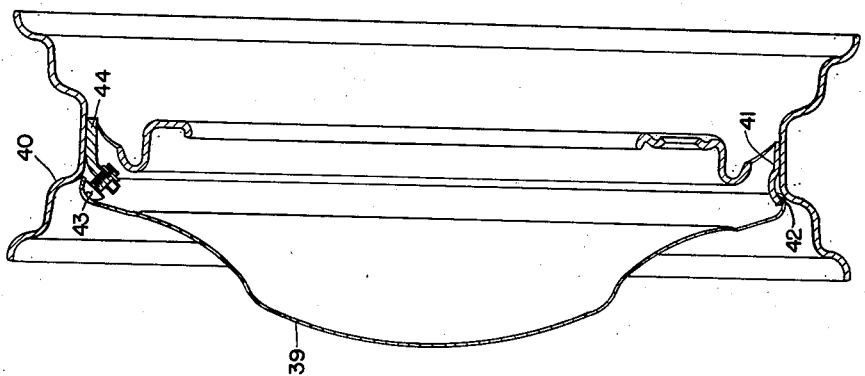
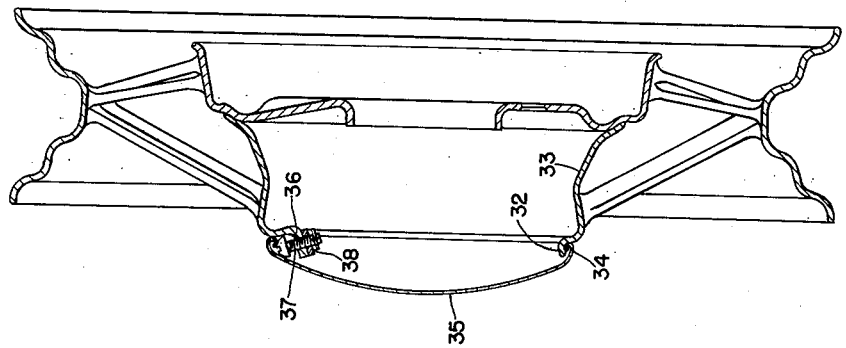
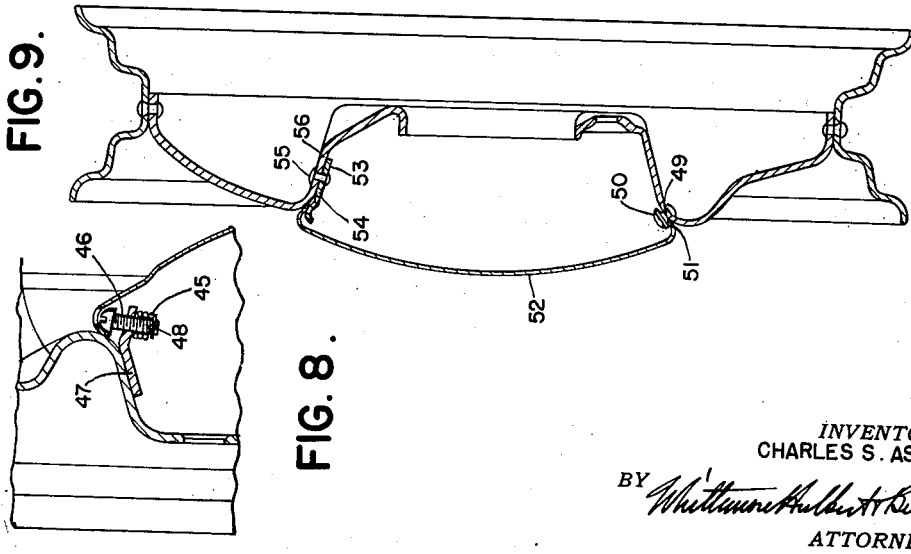
INVENTOR
CHARLES S. ASH
BY *Whittemore Hulbert & Belknap*
ATTORNEYS Patented Sept. 3, 1940

2,213,265

UNITED STATES PATENT OFFICE 2,213,265

ROAD VEHICLE WHEEL

Charles S. Ash, Milford, Mich., assignor to Kelsey-Hayes Wheel Company, Detroit, Mich., a corporation of Delaware Application April 7, 1937, Serial No. 135,516
In Great Britain April 8, 1936

10 Claims. (Cl. 301—108)

The invention relates to road vehicle wheels and refers more particularly to covers for such wheels.

The invention has for some of its objects to provide an improved cover and mounting for the cover so constructed and arranged that the cover may be readily attached to and easily removed from the wheel without the necessity of roughly using the cover; and to provide an improved cover and mounting for the cover so constructed and arranged that the cover upon assembly assumes a definite or predetermined position with respect to the wheel.

The invention has for other objects to provide a mounting for the cover comprising a stationary member upon the wheel engageable with the cover and a movable member also upon the wheel and movable generally outwardly from the axis of the cover into securing relation to the cover, whereby the cover may be definitely or predeterminedly positioned; to provide for adjusting the movable cover securing member from outside the cover; to so construct and arrange the cover and the movable securing member that the contacting portions of the two may conform to each other; to so construct and arrange the cover and the movable securing member that the latter in securing position may close the hole formed in the cover for the passage of the tool for operating the movable securing member; and to form the mounting for the cover in a manner such that the mounting may lock the cover from rotation.

These and other objects of the invention will become apparent from the following description and claims, taken in connection with the accompanying drawings, in which Figure 1 is a fragmentary elevation showing one embodiment of my invention;

Figure 2 is a cross section on the line 2—2 of Figure 1;

Figure 2A is an enlarged view of a portion of Figure 2; Figure 2B is an enlarged cross section on the line 2B—2B of Figure 2;

Figures 3, 4, 5 and 5A are enlarged detail sectional views showing modifications;

Figures 6 and 7 are views similar to Figure 2 showing other embodiments of my invention;

Figure 6A is an enlarged view of a portion of Figure 6;

Figure 8 is an enlarged detail sectional view showing another modification;

Figure 9 is a view similar to Figure 2 showing another embodiment of my invention.

Referring to the embodiment illustrated in Figures 1, 2, 2A and 2B of the drawings, the wheel comprises the tire carrying rim 1 and the wheel body 2. The tire carrying rim is of the drop-center type and the wheel body is of the well known spider formation and secured to the base of the well of the rim in any suitable manner, for example, by means of rivets 3. The wheel body is dished or recessed toward its center and is shown as provided with a plurality of holes 4 in its bolting-on flange 5 for the passage of suitable securing means, such as bolts, by means of which the wheel is adapted to be secured to the wheel hub (not shown). 6 is the cover, commonly known as a hub cap, for closing the central dished or recessed portion of the wheel body and concealing the means for securing the wheel to the wheel hub.

For mounting the cover upon and securing the cover to the wheel, I have provided the plurality of stationary members 7 (two, as shown in the drawings), and the movable member 8, these members being angularly spaced at substantially equal distances apart and suitably secured to the annular wall 9 of the dished or recessed portion of the wheel body. The stationary members 7 are in the nature of clips or tongues fixedly secured to the annular wall 9 by suitable means, such as rivets or by welding, and having free ends which extend beyond the annular wall and are turned outwardly from the wheel axis. The movable member 8 comprises the tongue or arm 10 also fixedly secured by suitable means, such as rivets or by welding, to the annular wall 9 and having a free end extending beyond this annular wall and turned inwardly toward the wheel axis and the threaded member 11 in the nature of a screw threadedly engaging the free end of the tongue or arm 10. This threaded member extends substantially radially and perpendicularly with respect to the wheel axis, its head being remote from the wheel axis. 12 is a split pin extending through the inner end of the threaded member and adapted to engage the free end of the tongue or arm 10 to prevent complete withdrawal of the threaded member from the tongue or arm.

The cover 6 is provided with retaining means thereon for cooperation with the securing members. As shown, the annular margin of the cover is constructed in the form of an inturned lip 13 terminating in the turned-over or return-bent part 14. The inturned lip is adapted to abut the wheel body and the turned-over part is adapted to be engaged by the free ends of the clips or tongues 7 and by the head of the threaded member 11. When fitting the cover on the wheel, the inturned marginal lip 13 is brought to rest on the wheel body and the turned-over part is engaged over the free ends of the clips or tongues 7. At this time the threaded member 11 occupies an inward position to clear the turned-over part. After the cover has been thus positioned, the threaded member is adjusted outwardly away from the wheel axis and brought into firm contact with the turned-over part. For the purpose of providing access to the threaded member, the cover is formed with the hole 15 which is adapted to be positioned in registration with the threaded member and through which a suitable tool, such as a screw driver, may be passed to engage the slot in the head of the threaded member. Upon outward movement of the threaded member the inturned lip is pressed firmly against the wheel body and is tensioned in the direction of adjustment of the threaded member.

With this construction, it will be seen that the stationary securing members 7 definitely or predeterminedly position the cover with respect to the wheel body and that they cooperate with the movable securing member in securing the cover in position. Also with this construction the cover may be readily attached to and easily removed from the wheel body without deforming the cover or in any manner roughly using the same.

Figure 3 illustrates a modification of the stationary securing elements 7. In this construction the stationary securing elements consist of studs 16 secured within holes formed in the wheel body at substantially the junction of the annular wall 17 of the dished or recessed portion and the web portion 18 of the wheel body. The heads 19 of the studs are positioned to provide gaps between these heads and the adjacent portions of the wheel body for receiving the inturned marginal lip 20 of the cover 21. The heads 19 are also of such diameter as to provide anchorage for the inturned lip.

When employing a cover and mounting of the kind illustrated in Figure 3, it is advantageous to shape the inturned lip in radial section to conform to the contour of the head of the adjustable screw 22, as shown in Figure 4. When the screw is turned or adjusted outwardly with respect to the wheel axis to secure the cover in position on the wheel, the head of the screw fits closely against the inner surface of the lip and the adjacent portion of the cover 23 and effectively closes and seals the hole 24 in the cover through which the operating tool, such as a screw driver, may be passed. As in the previous construction, a split pin 25 extending through the inner end of the screw prevents complete withdrawal of the screw from the tongue or arm 26 in which the screw is threaded.

Figure 5 illustrates a modification of the adjustable screw illustrated in Figure 4. In this modification, the contour of the inner part of the head 27 of the screw 28 has the shape of the previous construction and fits closely against the inner surface of the inturned marginal lip and the adjacent portion of the cover 29. The screw, however, is also formed with means to prevent rotation of the cover when in position on the wheel, such means comprising an outer preferably cylindrical extension 30 of the screw head. This extension is of reduced diameter as compared with the inner part of the head and extends outwardly through the tool accommodating hole 31 in the cover. The diameter of the extension is advantageously such that it fits snugly within the hole. A split pin corresponding to the split pin 12 of Figures 1, 2, 2A and 2B serves to prevent complete withdrawal of the screw.

The cover and the mounting for the cover may also be employed in wire spoked wheels, as illustrated in Figures 6 and 6A. A plurality of tongues or lugs 32 (preferably two) corresponding to the stationary members 7 of Figures 1, 2, 2A and 2B are formed integrally with the hub shell 33, these tongues or lugs projecting toward the outside of the wheel and at their free ends being bent in the direction of the wheel rim to provide an effective seating for the inturned marginal lip 34 of the cover 35. The tongue or projection 36 corresponding to the tongue or arm 10 of Figures 1, 2, 2A and 2B and carrying the adjustable screw 37 is also shown as being formed integrally with the hub shell. However, it is to be understood that these tongues 32 and 36 may be attached to the hub shell in any other convenient manner, for example, as by welding or riveting. The tongue or projection 36 is preferably reinforced by the metallic or other plate 38 permanently attached thereto. This structure is also provided with a split pin corresponding to the split pin 12 of Figures 1, 2, 2A and 2B.

Figure 7 illustrates the attachment of the cover 39 directly to another part of the wheel and more particularly to the tire carrying rim 40. Stationary members 41 corresponding to the stationary members 7 of Figures 1, 2, 2A and 2B are secured to the base of the well of the rim and have free ends spaced inwardly from the rim to provide gaps for receiving the inturned marginal lip 42 of the cover. The adjustable screw 43 threadedly engages the free end of the tongue or arm 44 also secured to the base of the well of the rim. The head of this screw upon rotation of the screw to move the same outwardly away from the axis of the wheel is adapted to clamp the inturned marginal lip 42 against the rim. The cover of this modification is shown as being of the kind described with reference to Figures 3 and 4, but it may obviously be modified by the addition of a turned-over marginal part upon the lip similar to the construction illustrated in Figures 2 and 2A. An arrangement of this kind may be used in conjunction with either of the wheel bodies previously described. A split pin corresponding to the split pin 12 of Figures 1, 2, 2A and 2B is also used in this construction.

A further modification of the adjustable screw securing means is illustrated in Figure 8, this construction embodying a helical spring 45 arranged about the screw 46 and interposed between the tongue or arm 47 and the split pin 48, which corresponds to the split pin 12 of Figures 1, 2, 2A and 2B. The spring serves to prevent accidental rotation of the screw due to vibration or other indirect causes.

Figure 9 illustrates another modification in which the stationary securing elements consist of studs 49 having the heads 50 of such diameter as to provide an anchorage for the inturned marginal lip 51 of the cover 52, the arrangement of these parts being similar to that of the corresponding parts in Figure 3. The stationary securing member 53 is a spring clip 54 which is fixedly secured at one end as by means of the rivet 55 to the annular wall 56 of the central dished or recessed portion of the wheel body. The free end of this spring clip extends generally outwardly from the axis of the wheel or cover and is then return-bent to facilitate engagement of the cover. The terminal portion of the spring clip is adapted to engage the inturned marginal lip 51 and to hold the same against the wheel body. The studs 49 and the spring clip 54 are spaced substantially 120 degrees apart. The portions of the bevels upon the heads 50 of the studs engaged by the edge of the inturned lip of the cover are inclined sufficiently relative to the axis of the wheel or cover to function with the spring clip 54 to retain the cover in place. However, these angles are relatively small so that the cover may be removed by inserting a tool, such as a screw driver, between the cover and the wheel body at any point and prying with this tool, at which time the spring clip will yield to allow the cover to be removed without rough usage of the latter.

What I claim as my invention is:

1. In a road vehicle wheel, the combination with a cover having a peripheral lip with a portion extending toward the axis of the cover, of means for securing the cover in position on the wheel comprising a member upon the wheel and over which said lip portion is engaged, and a screw upon and adjustable with respect to the wheel in a generally radially outward direction into engagement with said lip portion to secure the cover positively in position.

2. In a road vehicle wheel, the combination with a cover having a body portion and a lip with a portion extending toward the axis of the cover, of means for securing said cover in position comprising a member on the wheel adjustable to securing position from outside said cover in a generally radially outward direction, said member having a part between said body portion and lip portion in securing engagement with said lip.

3. In a road vehicle wheel, the combination with a cover having a body portion and retaining means thereon with a portion extending toward the axis of the cover, of means for securing said cover in position comprising a member on the wheel adjustable to securing position from outside said cover in a generally radially outward direction, said adjustable member having a part between said body portion and retaining means portion in securing engagement with the latter.

4. In a road vehicle wheel, the combination with a cover having a body portion and retaining means thereon with a portion extending toward the axis of the cover, of means for securing said cover in position comprising a threaded member on the wheel having a part between said body portion and retaining means portion, said threaded member being adjustable in a generally radially outward direction to bring said part into securing engagement with said retaining means portion.

5. In a road vehicle wheel, the combination with a cover having a generally radially extending portion and a generally axially extending portion, said last mentioned portion being formed with a hole, of means for detachably securing said cover in position on the wheel comprising a member mounted on the wheel at the generally axially inner side of said first mentioned cover portion and adjustable generally outwardly from the axis of the wheel from a position in which the hole is open to a position closing the hole.

6. In a road vehicle wheel, the combination with a cover having a generally radially extending portion and a generally axially extending portion, said last mentioned portion being formed with a hole, of means for detachably securing said cover in position on the wheel comprising a member mounted on the wheel at the generally axially inner side of said first mentioned cover portion and adjustable generally outwardly from the axis of the wheel, said member in inoperative position leaving the hole open and in operative position having a part projecting into the hole upon said adjustment of said member.

7. In a road vehicle wheel, the combination with a cover having a body portion and peripheral lip with a portion extending toward the axis of the cover, of a pair of angularly spaced generally radially inwardly extending studs upon the wheel each having an enlarged head axially inwardly of said cover body portion over which said lip portion is engaged, and means upon the wheel angularly spaced from said studs for securing the cover in position on the wheel, said means being movable generally radially outwardly to securing position and having a part between said body portion and lip portion and in securing engagement with the latter.

8. In a road vehicle wheel, the combination with a cover having a body portion and retaining means thereon with a portion extending toward the axis of the cover, said cover being formed with a hole, of means for securing said cover in position comprising a member on the wheel in substantial alignment with the hole and adjustable in a generally radially outward direction to securing position, said adjustable member having a part between said body portion and retaining means portion and engaging said retaining means portion and closing the hole.

9. In a road vehicle wheel, the combination with a cover having a body portion and retaining means thereon with a portion extending toward the axis of the cover, said cover being formed with a hole, of means for securing said cover in position comprising a member on the wheel in substantial alignment with the hole and adjustable in a generally radially outward direction to securing position, said adjustable member having a part between said body portion and retaining means portion and engaging the latter, said adjustable member also having a part projecting into the hole upon adjustment in a generally radially outward direction of said member.

10. In a road vehicle wheel, the combination with a cover and retaining means thereon having a portion extending generally inwardly toward the axis of the cover, of means upon the wheel engageable with the retaining means portion to secure the cover in position, said means comprising a member fixed upon the wheel and engageable with the retaining means portion, a second member fixed upon the wheel and angularly spaced from the first mentioned member, a screw threadedly engaging the second mentioned member and adjustable generally radially outwardly from the axis of the cover into securing engagement with the retaining means portion, and resilient means for holding the screw from rotation.

CHARLES S. ASH.